United States Patent [19]

Ruda et al.

[11] 4,394,951

[45] Jul. 26, 1983

[54] ACTIVE TAPE STORAGE BIN

[75] Inventors: Joseph C. Ruda, Noblesville; Richard E. Wartzok, Indianapolis; Robert J. Wedekind, Logansport, all of Ind.

[73] Assignee: RCA Corporation, New York, N.Y.

[21] Appl. No.: 340,772

[22] Filed: Jan. 19, 1982

[51] Int. Cl.³ .................. B65H 17/42; G11B 15/56
[52] U.S. Cl. ................... 226/118; 226/170; 242/182
[58] Field of Search .......... 226/118, 170; 242/182, 242/183, 185; 360/71, 73; 346/74.1

[56] References Cited

U.S. PATENT DOCUMENTS

| 2,979,244 | 4/1961 | Pouliart et al. | 226/118 |
| 3,169,686 | 11/1965 | Rabinow | 226/26 |
| 3,203,607 | 8/1965 | Mason | 226/119 |
| 3,693,859 | 9/1972 | Nielsen | 226/118 |
| 4,000,516 | 12/1976 | Watanabe et al. | 360/71 |
| 4,110,758 | 8/1978 | Nelson et al. | 346/74.1 |
| 4,196,832 | 4/1980 | Kusters et al. | 226/118 |

FOREIGN PATENT DOCUMENTS 382096 11/1964 Fed. Rep. of Germany.
1008331 1/1963 United Kingdom.

Primary Examiner—Leonard D. Christian
Attorney, Agent, or Firm—E. M. Whitacre; J. S. Tripoli; D. A. Kulkarni

[57] ABSTRACT

A conveyor belt is located along the bottom of a tape bin to support a stack of tape folds. The tape bin contains a U-shaped cradle for shaping the upper run of the conveyor belt. The conveyor belt drives the tape stack around the U-turn from the feed end of the bin to its payout end to present the output end of the tape with very little resistance or pressure from the tape stack.

10 Claims, 4 Drawing Figures

ACTIVE TAPE STORAGE BIN

This invention relates to magnetic tape duplicating systems, and more particularly, it concerns tape storage devices for use in such systems.

Mass production of copies from a magnetic tape master involves the use of a continuous loop of master tape. Conventionally, an endless loop of master tape (790 to 2,375 feet long) is drawn past a magnetic pickup head at high speeds (e.g., 60 to 480 inches per second). The signals at the output of the pickup head are fed to a plurality of tape duplicating machines (i.e., slaves) to simultaneously record a multitude of copies. The choice of the number of tape duplicating machines attached to a single master tape transport is govered by the amount of fan-out desired.

The master tape unit, typically, includes a dual capstan tape drive comprising a capstan/pinch roller assembly disposed on either side of the pickup head. A bin is utilized to store and dispense the excess tape between the output and input capstans. As the tape is released into the top of the bin at one end thereof, it builds a stack of folds. The stored tape is pulled out from the bottom of the bin at its other end. Variations in the tape tension can be experienced as a result of the changes in the weight of the accumulated tape in the storage bin on the tape being withdrawn from the bin.

An improvement, pursuant to this invention, reduces the possibility of fluctuations in the tape tension, thereby enhancing the recording conditions and extending the tape life. The improvement includes a conveyor belt located along the bottom of the storage bin to support the accumulated tape stack. A U-shaped guide surface shapes the upper run of the conveyor belt. The conveyor belt is driven from the feed end of the bin to its payout end to turn the tape stack through 18°, around the U-shaped path, to provide the outgoing end of the tape with very little resistance or pressure from the accumulated tape in the bin.

In accordance with a further feature of the invention, the conveyor belt is provided with a variable speed drive to accommodate differences in the length of the master tape (e.g., 790 to 2,375 feet).

Figure 1:
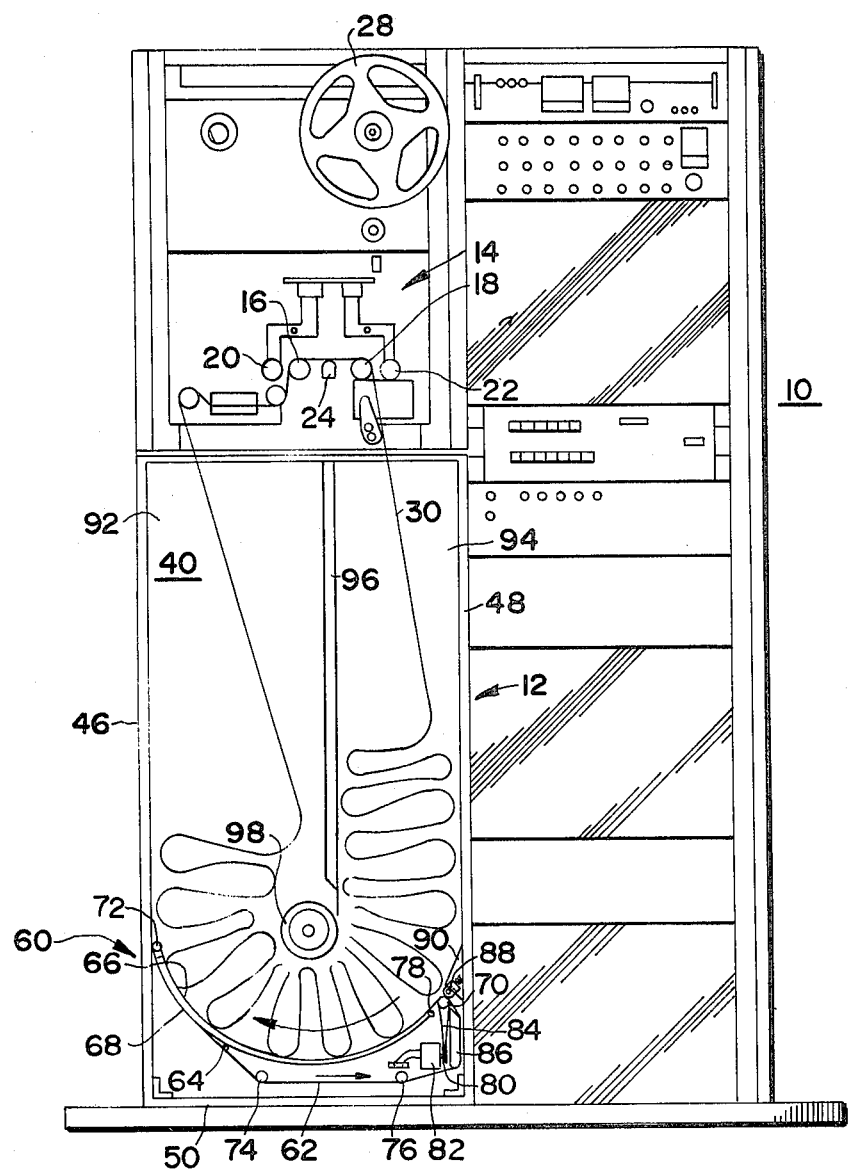
FIG. 1 illustrates a tape mastering unit incorporating an active tape storage bin according to the principles of the present invention.

Depicted in FIG. 1 is a master tape transport system 10 employing a tape storage bin 12 modified in accordance with the principles of the present invention. The mastering machine 10 contains a conventional tape transport mechanism 14 represented by capstans 16 and 18 with their associated pinch rollers 20 and 22. The input and output capstans 16 and 18 are driven by respective drive motors, and the pinch rollers 20 and 22 are activated by corresponding actuators. The capstan drive motors and the pinch-roller actuators respond to command signals emanating from the tape unit when appropriate switches are activated. A magnetic pickup head 24 is located between the input capstan 16 and the output capstan 18.

To load a tape master, a reel 28 containing the master tape 30 (790 to 2,375 feet long) is mounted on the tape transport machine 10. The free end of the tape is threaded through the tape basket 12, and the reel is unwound to dump the tape into the basket. The two ends of the tape are then spliced together to form a continuous loop. The tape is then threaded through the transport mechanism 14, and the machine is started. To maintain adequate tape tension across the playback head 24, the outgoing capstan 18 has a slightly larger diameter (e.g., 0.004 inches) as compared to the incoming capstan 16. The tape transport is similar to System-8000 made by Electrosound Company, N.Y.

Figure 2:
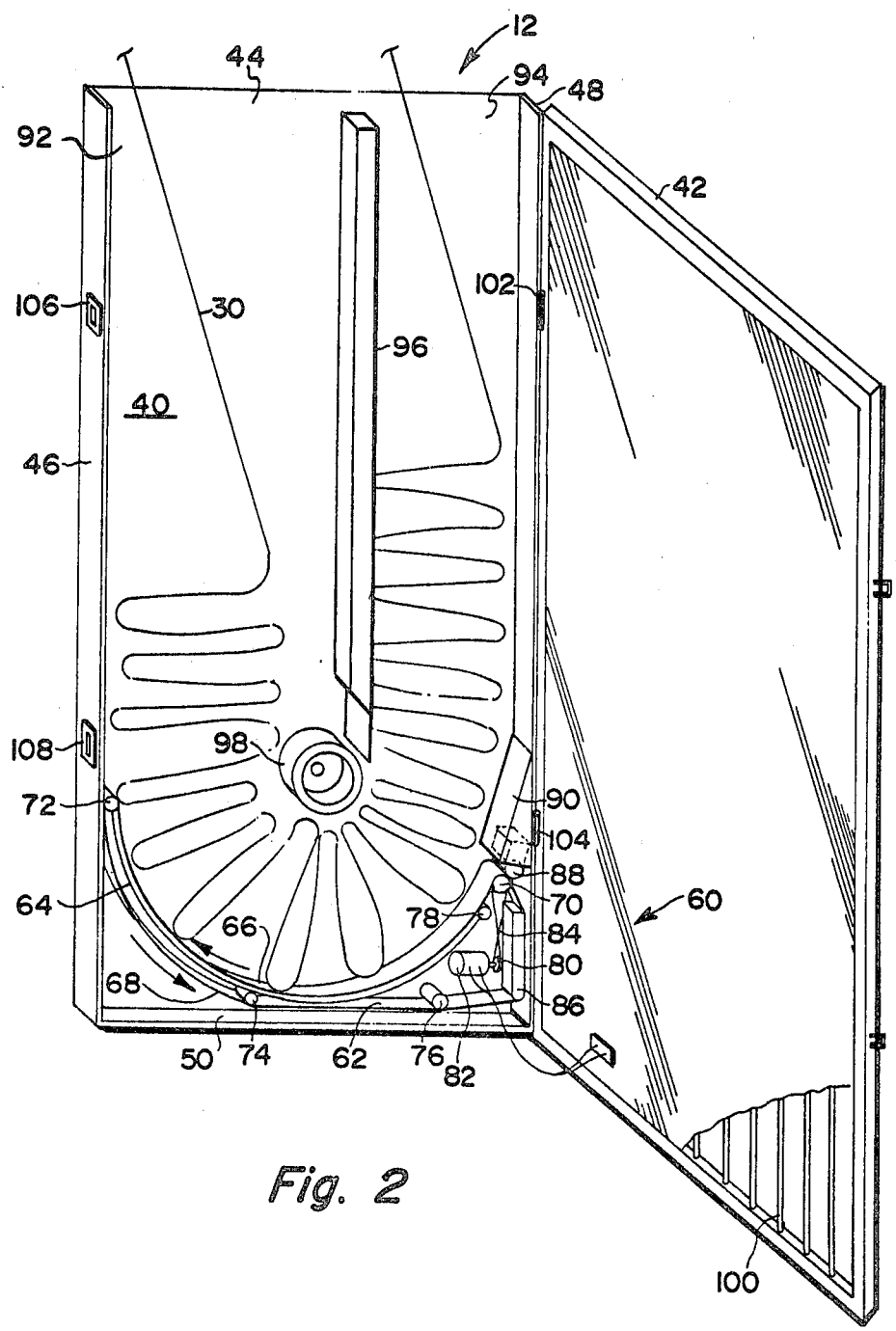
FIG. 2 shows a perspective front view of the tape storage bin of FIG. 1.
Figure 3:
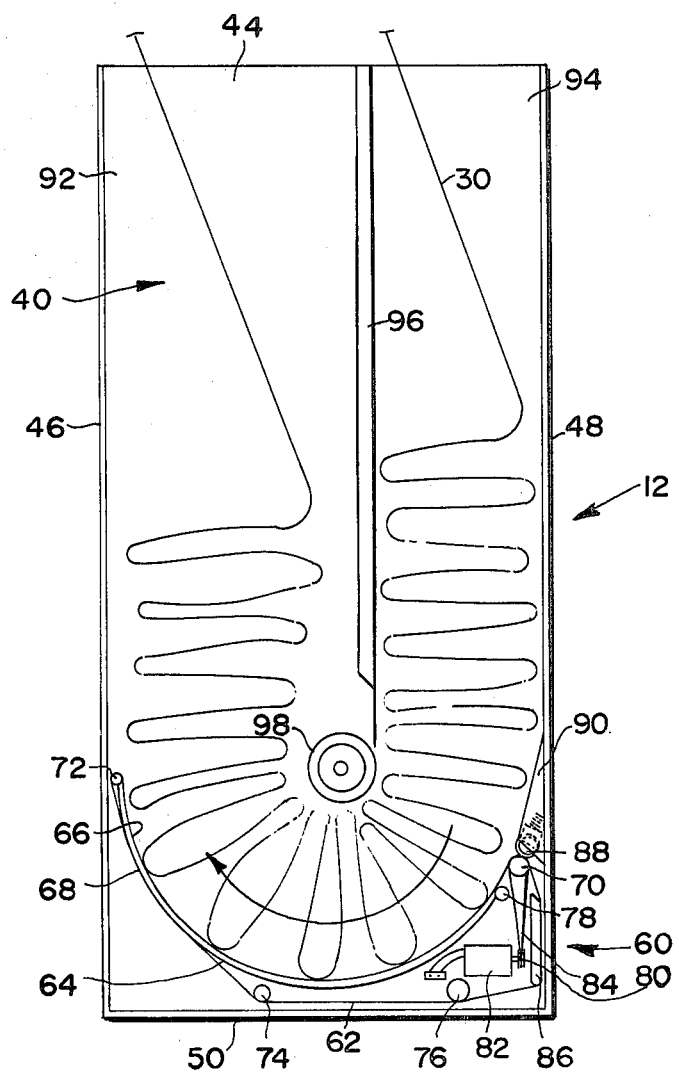
FIG. 3 represents an elevational view of the subject tape storage bin.

The tape storage bin 12, shown in FIGS. 1-3, comprises a substantially vertical compartment 40 formed by a pair of front and rear walls 42 and 44 respectively. The end walls 46 and 48, and the bottom wall 50 are suitably connected to the rear wall 44. The overall dimensions of the tape bin 12 are approximately 24×50×2 inches. The space between the walls 42 and 44 provides sufficient clearance for the tape stack to move freely in the vertical direction. The clearance is, however, insufficient for the tape folds to twist or to get side-by-side. Illustratively, the internal wall spacing is 1.125 inches to accommodate one inch wide tape.

When the tape is released into the tape basket, it moves down toward the bottom thereof, and as additional tape continues to feed therein, the tape flexes and forms a series of folds. The tape doubles back upon itself and the formation of the folds continues, building a stack of doubled-back smoothly-curved folds. As the tape is being fed into the top of the tape bin 12 at one end thereof, it is pulled out from the other end of the bin in the manner shown.

The tape storage bin 12 contains an improvement 60 embodying the principles of the present invention. The improvement comprises a conveyor belt 62 located near the bottom of the tape basket 12. The conveyor belt comprises an endless loop of mylar tape. A U-shaped belt guide 64 is secured to the back wall 44, and is located between the upper and the lower runs 66 and 68 of the conveyor belt 62. The conveyor belt 62 is entrained over a drive roller 70, and a set of guide posts 72, 74, 76 and 78 in the manner indicated. The output sprocket 80 of a variable speed D. C. motor 82 drives the roller 70 by means of a bead chain 84. Disposed in the tape basket 12 is a guide plate 86 to align the conveyor belt 62 to the drive roller 70. A spring-loaded pressure roller 88 holds the conveyor belt 62 against the drive roller 70 to ensure positive drive of the conveyor belt. A deflector plate 90 guides the master tape around the pressure roller 88 to the conveyor belt 62. It will be seen that the drive motor 82 is located such that the slack side of the conveyor belt 62 is over the U-shaped guide surface 64, so that the conveyor belt follows the guide surface even in the absence of tape 30 in the bin 12.

The compartment 40 is divided into the input and output sections 92 and 94 by a baffle 96 in order to segregate the outgoing tape from the incoming tape. An idler wheel 98 is located near the bottom end of the partition 96. The wheel 98 is rotated by the tape column as it turns the corner to diminish the frictional drag on the tape.

The walls of the tape basket 12, with the exception of the front cover 42, are fabricated from stainless steel. The cover 42 is made from plexiglas to facilitate observation. Mounted on the internal surface of the plexiglas cover 42 are strips of conductive foil 100, illustrated in FIG. 2, to drain off static charges that could be generated during the operation.

The front cover 42 is hinged to the side wall 48 at points 102 and 104, as can be seen in FIG. 2, to provide access to the interior of the tape bin 12, e.g., to thread the tape 30 through the bin 12. Latches 106 and 108 are provided to securely lock the cover 42 in place.

The conveyor belt 62 is driven from the feed end of the bin 12 to its payout end to rotate the tape stack around the approximately 180° turn to present the output end of the tape at the payout end with little, if any, of the weight of the tape column thereon. Reduction of the weight of the tape stack on the loops being picked up at the payout end of the bin 12 reduces the possibility of changes in the tape tension across the magnetic head 24, whereby the recording quality is improved and the tape life is enhanced. A further advantage of the reduction in the fluctuations in the tape tension is the potential of employing higher tape speeds (e.g., 240 to 480 inches per second).

To accommodate differences in the length of the master tape (e.g., 790 to 2,375 feet), the speed of the drive motor 82 is manually adjusted (e.g., within 10 to 40 rpm range) to provide the desired conveyor speed (e.g., 40 to 95 inches per minute). It is possible to automatically vary the conveyor speed in response to inputs from sensors reacting to changes in optimum conditions. The drive motor 82 is made by TRW Globe Inc., Model No. 43A144-4.

Figure 4:
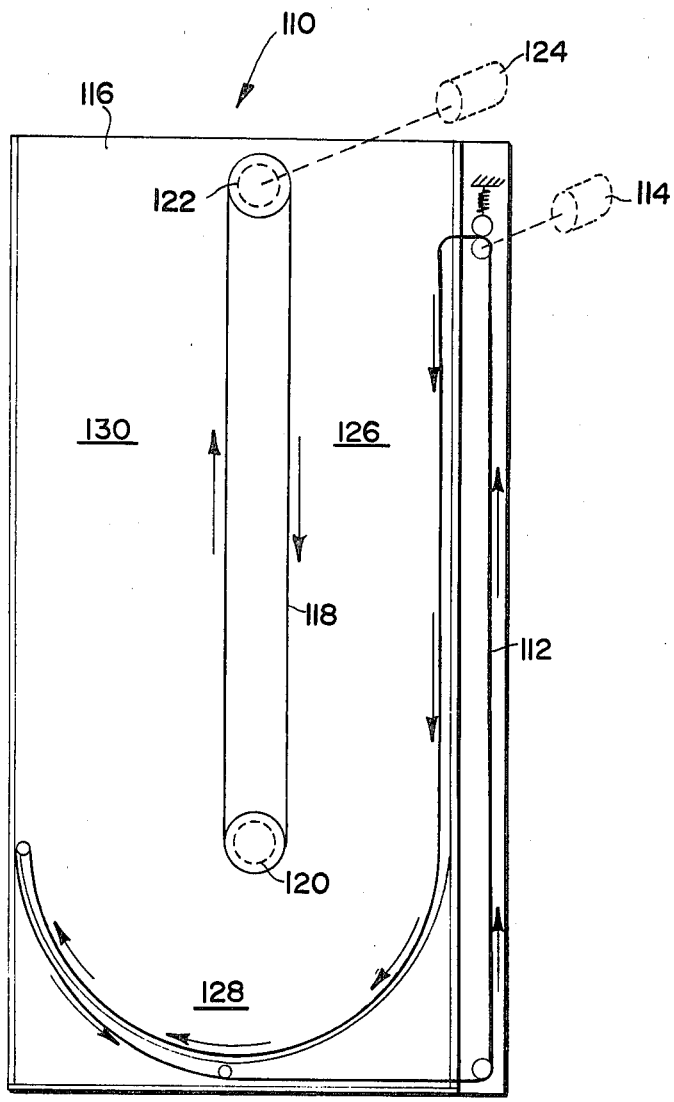
FIG. 4 is a front view of another embodiment of the instant invention.

FIG. 4 represents a further embodiment 110 of the present invention. In the embodiment 110, a conveyor belt 112, which corresponds to the conveyor belt 62, is driven by a motor 114 mounted outside the main chamber 116. The partition 96 in the previous embodiment is replaced by an endless belt 118 disposed over a pair of pulleys 120 and 122. The pulley 122 is driven by a motor 124. The speeds of the conveyor belts 112 and 118 are synchronized to obtain a smooth progression of the tape column from the input section 126, around the turn 128, to the output section 130 of the tape compartment 110. The operation of the two embodiments is similar.

What is claimed is:

1. A magnetic tape handling apparatus comprising:
   (A) a substantially vertical compartment defined by a pair of walls which are so spaced as to require the supply of tape in said compartment to form a stack of folds as the tape is fed into said compartment at one end thereof; said tape being paid out from said compartment at its other end;
   (B) a conveyor belt located along the bottom of said compartment for supporting said tape stack; said conveyor belt having an upper run and a lower run;
   (C) means arranged in said compartment for shaping at least a portion of the upper run of said conveyor belt along a U-shaped path; and
   (D) means for driving said conveyor belt from said one end to said other end to rotate said stack of folds around said U-shaped path for presenting the payout end of said tape stack at said other end for removal from said compartment.

2. The magnetic tape handling apparatus as defined in claim 1 wherein said shaping means causes said belt to follow a semicircular path.

3. The magnetic tape handling apparatus as defined in claim 1 wherein said conveyor belt comprises an endless loop of mylar tape.

4. The magnetic tape handling apparatus as defined in claim 1 further including a divider disposed in said compartment for segregating the incoming tape from the outgoing tape.

5. The magnetic tape handling apparatus as defined in claim 4 wherein said divider comprises an endless belt entrained over a pair of pulleys.

6. The magnetic tape handling apparatus as defined in claim 5 wherein one of said pulleys is driven in a desired direction.

7. The magnetic tape handling apparatus as defined in claim 1 wherein said driving means comprises an electric motor located near the input end of said U-shaped path.

8. The magnetic tape handling apparatus as defined in claim 1 wherein said driving means comprises a variable speed motor so that the speed of the conveyor belt can be changed to accommodate different lengths of tape.

9. In the magnetic tape machine provided with a substantially vertical compartment; a tape head located near the upper part of said compartment; means for driving an endless loop of tape past said head; said compartment having walls which are so spaced as to require the supply of tape in said compartment to form a stack of folds as the tape is fed into said compartment at one end thereof; said tape being paid out from said compartment at its other end; the improvement comprising:
   (A) a conveyor belt disposed along the bottom wall of said compartment for supporting said tape stack; said conveyor belt having an upper run and a lower run;
   (B) a U-shaped guide track located in said compartment for causing at least a portion of the upper run of said belt to conform to a U-shaped path; and
   (C) means for driving said belt from said one end to said other end of said compartment to guide said tape stack around said U-shaped track to present the payout of said tape stack at said other end for removal from said compartment substantially free from the pressure of said tape stack.

10. A magnetic tape handling apparatus comprising:
    (A) a substantially vertical compartment defined by a pair of walls;
    (B) drive means for feeding said magnetic tape into said compartment at the feed end thereof and for withdrawing it from said compartment at its payout end; the spacing between said walls being slightly greater than the width of said tape so that said tape forms a stack of folds as the tape is introduced into said compartment;
    (C) a continuous loop conveyor belt disposed along the bottom of said compartment for supporting said tape stack; said conveyor belt having an upper run and a lower run;
    (D) a U-shaped guide surface disposed between the upper and the lower runs of said belt; the weight of said tape stack causing at least a portion of the upper run of said belt to conform to said U-shape guide surface; and
    (E) means for driving said conveyor belt from said feed end to said payout end to turn said tape stack around said U-shaped guide surface for presenting the payout end of said tape stack for removal substantially free from hindrance from said tape stack.

* * * * *